(12) United States Patent
Davis et al.

(10) Patent No.: US 6,915,462 B1
(45) Date of Patent: Jul. 5, 2005

(54) METHOD AND APPARATUS FOR A PROGRAMMABLE DESKEW CIRCUIT

(75) Inventors: Barry Allen Davis, Union City, CA (US); Walter F. Bridgewater, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 394 days.

(21) Appl. No.: 10/209,552

(22) Filed: Jul. 30, 2002

(51) Int. Cl.[7] .............................................. G11B 20/20
(52) U.S. Cl. ..................................... 714/700; 370/508
(58) Field of Search ..................... 360/40, 26; 327/277; 398/79; 714/744, 700; 713/503; 370/508

(56) References Cited

U.S. PATENT DOCUMENTS

| | | | | |
|---|---|---|---|---|
| 3,710,361 A | * | 1/1973 | Sonberg | 360/26 |
| 4,675,562 A | * | 6/1987 | Herlein et al. | 327/277 |
| 4,677,618 A | * | 6/1987 | Haas et al. | 714/700 |
| 5,157,530 A | * | 10/1992 | Loeb et al. | 398/79 |
| 5,566,188 A | * | 10/1996 | Robbins et al. | 714/744 |
| 6,031,847 A | * | 2/2000 | Collins et al. | 370/508 |
| 6,754,841 | * | 6/2004 | Yang | 713/503 |

* cited by examiner

*Primary Examiner*—David Ton
(74) *Attorney, Agent, or Firm*—Martine Penilla & Gencarella, LLP

(57) ABSTRACT

An invention is provided for a deskewer that corrects skew on a data channel. The deskewer includes a delay calculator that calculates deskew data indicating the amount of delay needed to correct skew on a data channel. Coupled to the delay calculator is a deskew circuit that receives the deskew data from the delay calculator and uses the deskew data to delay a bit stream on the data channel.

18 Claims, 8 Drawing Sheets

METHOD AND APPARATUS FOR A PROGRAMMABLE DESKEW CIRCUIT

CROSS REFERENCE TO RELATED APPLICATIONS

This application is related to (1) U.S. patent application Ser. No. 10/209,494 filed on Jul. 30, 2002, entitled "Apparatus And Method For Programmable Dual Stage Digital Filter," which is hereby incorporated by reference in its entirety.

BACKGROUND OF THE INVENTION

1. Field of the Invention

This invention relates generally to data communications and more particularly to deskewing circuits for deskewing multiple pipelined signals.

2. Description of the Related Art

Personal computers (PCs) have gained widespread use in recent years primarily because they are inexpensive and yet powerful enough to handle computationally intensive user applications. The data storage and data sharing capabilities of PCs are often expanded by coupling a group of such computers to peripheral devices such as disk drives, tape drives, and printers. These peripheral devices and the personal computers are interconnected through a single communications network, such as a local area network.

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

Using a SCSI network, bit information can be sent from target to target in a serial manner. Often, this bit information is processed at some point during transmission or at a target unit. Although standard SCSI provides an effective means of target to target network communication, often bit information intended for parallel processing can become skewed. Specifically, bit information is often processed using parallel data pipes, or channels, each of which processing its particular bit information in a specific manner. Under some circumstances, these parallel channels can get out of sync with each other, causing the pipelined data to become skewed with respect to the other channels.

As a result, subsequent data processing can fail because data from parallel channels can be processed at the wrong time. For example, if a particular channel is faster than other parallel channels, the data from the first channel will be processed before data from the other channels. That is, data from time to will be processed from the fast channel, while data from time $t_n$ is being processed from the other channels. Thus, although subsequent processing is expecting data from the same time period from each of the data channels, in actuality, data from different time periods is being processed.

In view of the foregoing, there is a need for deskewing circuits capable of realigning skewed data from parallel channels. In addition, the deskewing circuits should be adjustable, allowing the rate of deskewing to be changed. Moreover, the deskewing circuits should be capable of determining the amount of deskew to apply to particular channels, thus allowing the deskewing circuits to "learn" the characteristics of a particular data channel.

SUMMARY OF THE INVENTION

Broadly speaking, the embodiments present invention fill these needs by providing skew correction for parallel data channels based on the individual needs of each data channel. In one embodiment, a deskewer for correcting skew on a data channel is disclosed. The deskewer includes a delay calculator that calculates deskew data indicating the amount of delay needed to correct skew on a data channel. Coupled to the delay calculator is a deskew circuit that receives the deskew data from the delay calculator and uses the deskew data to delay a bit stream on the data channel.

A further deskew circuit is disclosed in another embodiment of the present invention. The deskew circuit includes a plurality of multiplexers coupled to an input bit stream. The plurality of multiplexers is capable of selecting a sample group of a number of consecutive bits equal to a size of a sample word from the input stream. In addition, an output circuit is included that is coupled to receive the sample group from the plurality of multiplexers. In operation, the output circuit delays the sample group for a predetermined number of clock cycles. Thus, using the selected sample group in conjunction with the output circuit delay, the deskew circuit of the embodiments of the present invention can inject as much delay as needed into the incoming bit stream to correct skew.

In a further embodiment, a deskew delay calculator is disclosed. The deskew delay calculator includes a plurality of shift registers serially coupled to an input line. Coupled to the plurality of shift registers is a plurality of rising edge detectors, each capable of determining whether a signal transition occurred within a particular shift register. In addition, a coarse delay decode unit is coupled to the plurality of rising edge detectors. The coarse delay decode unit is capable of indicating, based on the state of the rising edge detectors, an amount of delay that accounts for skew errors greater than a single sample word. Further, a fine delay select unit is coupled to the plurality of shift registers. The fine delay select unit is capable of indicating an amount of delay that accounts for skew errors less than a single sample word based on the state of a selected shift register. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a deskewing logic circuit that addresses signal skew on a multiple pipelined system. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
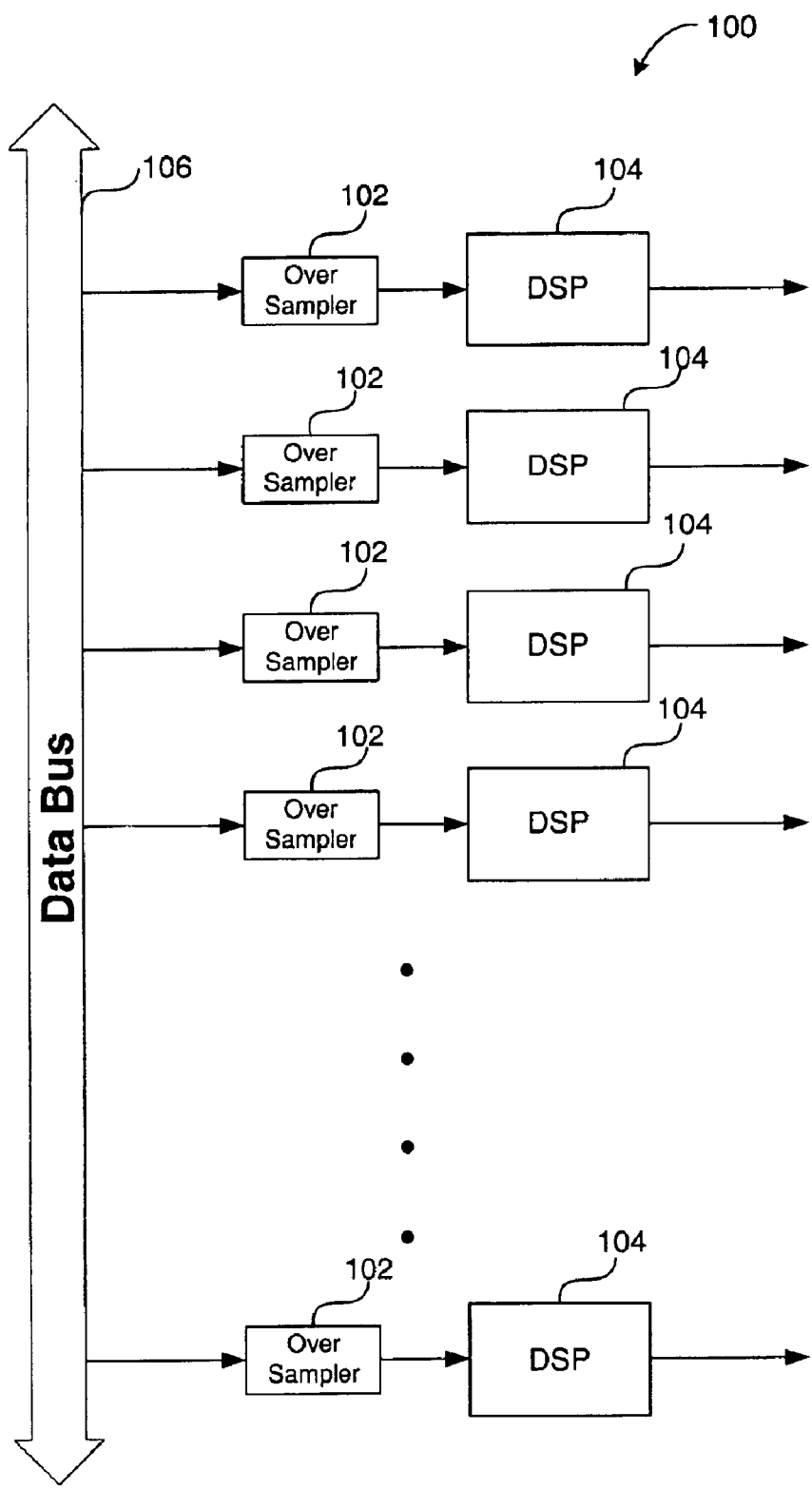
FIG. 1 is a block diagram showing a signal processing circuit, in accordance with an embodiment of the present invention.

FIG. 1 is a block diagram showing a signal processing circuit 100, in accordance with an embodiment of the present invention. The signal processing circuit 100 includes a plurality of over samplers 102, each receiving an input signal bit stream from a data bus 106. As described in greater detail subsequently, each over sampler 102 provides a parallel bit sample staggered in time to a corresponding digital signal processor (DSP) 104 for further processing.

The over samplers 102 and DSPs 104 form a plurality of data channels, each processing a single bit stream from the data bus 106. However, during transmission and processing, a bit stream may incur delays. Further, these delays may be skewed with respect to other channels, and thus not uniform from channel to channel. Embodiments of the present invention provide a mechanism for deskewing the bit streams from channel to channel, thus allowing the outputs of the DSPs 104 to be synchronized. Although, the embodiments of the present invention are shown using a data bus 106, over samplers 102, and other system elements, it should be noted that the embodiments of the present invention can be utilized in any circuit having parallel bit streams where deskewing is needed across the bit streams channels.

Figure 2:
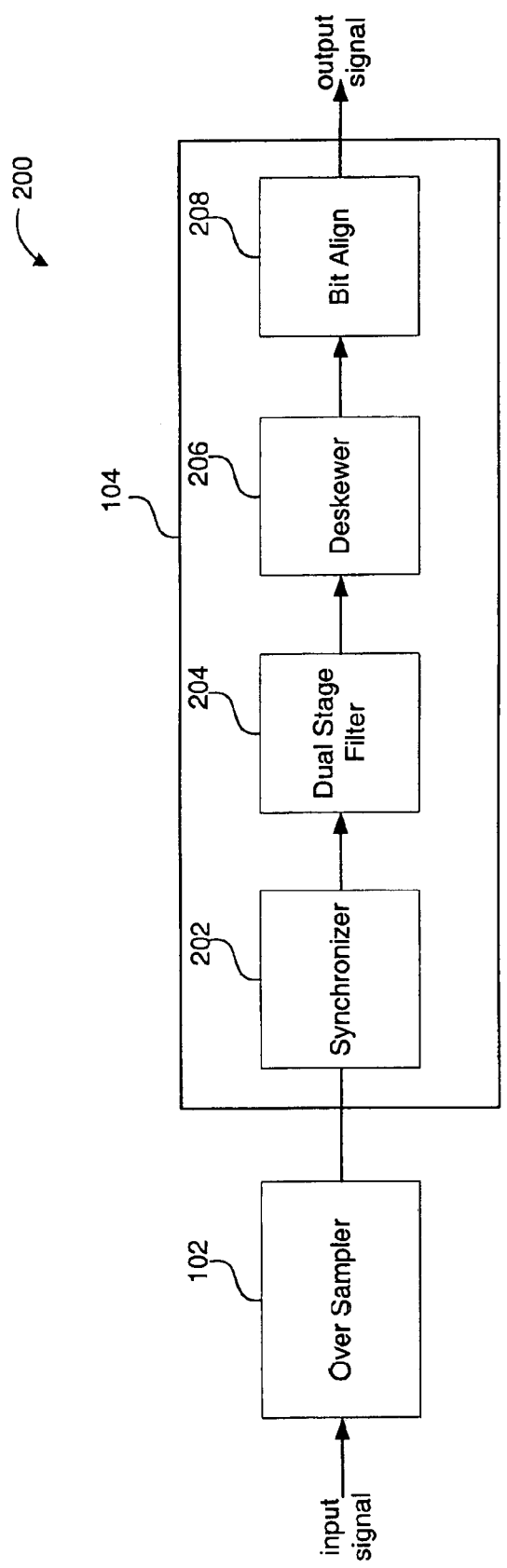
FIG. 2 shows an overview block diagram of a channel for deskewing an input signal bit stream in accordance with one embodiment of the present invention.

FIG. 2 shows an overview block diagram of a channel 200 for deskewing an input signal bit stream in accordance with one embodiment of the present invention. The channel 200 includes an over sampler 102 and a DSP 104. The over sampler 102 receives the input signals that are adapted to operate at a specified frequency and samples the input signals at a higher clock frequency to generate sets of N parallel bit samples staggered in time, where N can be any suitable integer number greater than 1. For example, the over sampler 102 may sample an input signal adapted to operate at 80 Mhz at 3.2 Ghz to generate groups of 8 parallel bit (i.e., a byte) sample data with each bit sample being staggered in time. It should be noted that the channel 200 processes a signal on a single line, such as a single SCSI line. As such, when used in conjunction with SCSI buses, a channel 200 may be provided for each SCSI line, such as data, ACK, REQ, P1 (parity 1), and P0 (parity 0) lines.

The DSP 104 includes a synchronizer 202, a dual stage filter 204, a deskewer 206, and a bit align 208 for processing the N parallel bit data samples. The synchronizer 202 is coupled to receive the N bit sample data from the over sampler 102 and synchronizes the data samples to an external clock that operates, for example, at 400 Mhz. The synchronizer 202 may be implemented using a four-byte rollover FIFO where incoming data is written into successive stages of the FIFO. The synchronizer 202 outputs a 14-bit word by using a shift register for input to the dual stage filter 204. The 14-bit output word from the synchronizer 202 includes eight bits of current sample byte and the last six bits of the previous sample byte.

The dual stage filter 204 is coupled to receive the 14-bit word from the synchronizer 202 and filters both one bit noise and burst noise to output a 16-bit output data. The deskewer 206 is coupled to the dual stage filter 204 to receive the filtered 16 bit data from the dual stage filter 204 and deskews any signal discrepancies of the DSP 104 with other DSPs. The deskewer 206 then outputs the deskewed and filtered data, using 8-bit data words, to the bit align 208, which aligns the output data with data in other DSPs.

Figure 3:
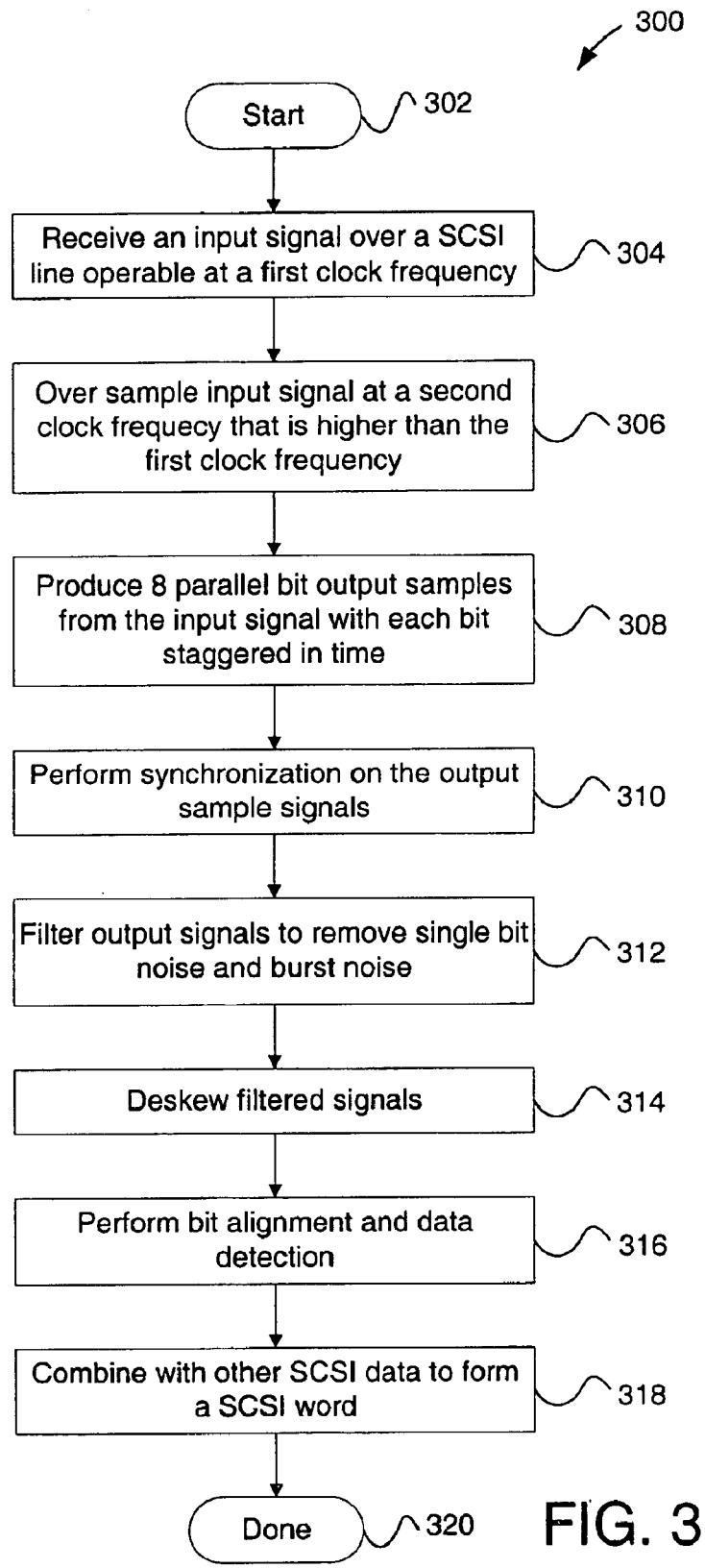
FIG. 3 is a flowchart showing an exemplary method for deskewing an input data bit stream in accordance with one embodiment of the present invention.

FIG. 3 is a flowchart showing an exemplary method 300 for deskewing an input data bit stream in accordance with one embodiment of the present invention. In this embodiment, the method 300 illustrates deskewing of a single bit stream of data on a single SCSI bus line. However, those skilled in the art will appreciate that the method 300 is equally applicable to other data or control lines that require deskewing. In an initial operation 302, preprocess operations are performed. Preprocess operations can include provisioning transmission hardware, transmitting data along a SCSI line, and other preprocess operations that will be apparent to those skilled in the art.

An input bit signal is received in operation 304 over a SCSI line that is adapted to operate at 80 Mhz. As mentioned previously, the input bit signal is received on as signal on a single line, such as a single SCSI line. As such, when used in conjunction with SCSI, buses, an input bit signal is received for each SCSI line, such as data, ACK, REQ, P1 (parity 1), and P0 (parity 0) lines.

The input signal then is over sampled in operation 306 at a second clock frequency (e.g., 3.2 Ghz) that is higher than the first clock frequency to ensure generation of N parallel bit samples. An eight parallel bit sample is then generated using the sampled data, in operation 308. Each of the N parallel bit samples is staggered in time. Then in operation 310, N parallel bit samples are synchronized and output along with the last M bits from the previous bit samples to form N+M output bits. For example, 8 parallel bit samples and the last 6 bits from previous bit samples may be output as a 14-bit word.

The N+M output bits are then filtered to remove a single bit noise and burst noise in operation 312 to output an N-bit filtered word. The N-bit word is then deskewed in operation 314. During the deskewing operation 314, the N-bit word can be delayed on fast data channels to match the data on slower data channels. The N bits are then aligned and data detection performed to generate a single SCSI bit signal in operation 316. Finally, the single SCSI bit is combined with other SCSI data to form a SCSI word in operation 318. Post process operations are performed in operation 320. Post process operations can include further signal processing, signal usage, and other post process operations that will be apparent to those skilled in the art.

Figure 4:
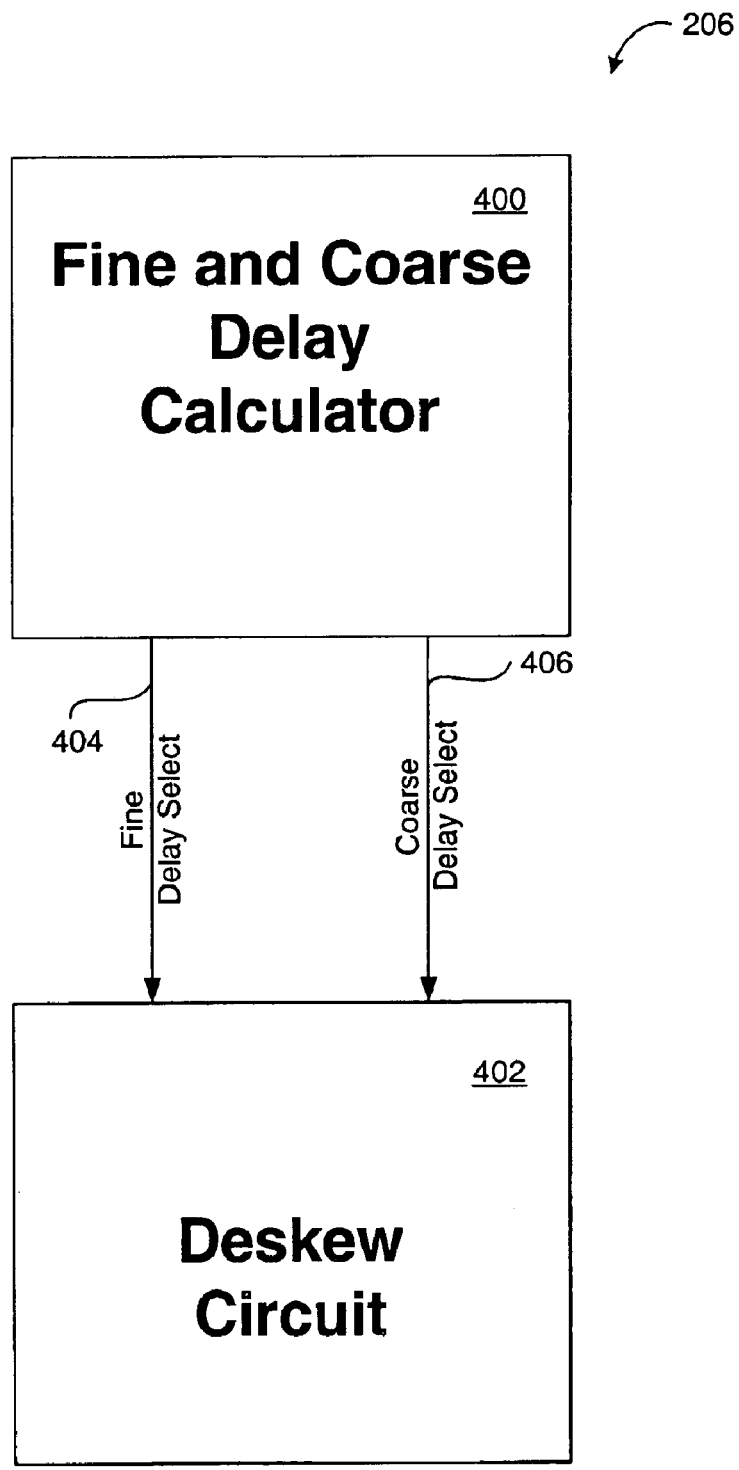
FIG. 4 is a block diagram showing a deskewer, in accordance with an embodiment of the present invention.

FIG. 4 is a block diagram showing a deskewer 206, in accordance with an embodiment of the present invention. The deskewer 206 includes a fine and coarse delay calculator 400 coupled to a deskew circuit 402. Broadly speaking, the fine and coarse delay calculator 400 operates to determine the amount of delay needed to deskew the data channel with respect to other data channels. The deskew circuit 402 includes the actual logic that delays the bit stream of the data channel according to the amount of delay calculated by the fine and coarse delay calculator 400.

Before normal data is transmitted though a DSP, training data is transmitted through the DSP, and particularly, through the deskewer 206. The fine and coarse delay calculator 400 uses the training data to determine the amount of delay needed to deskew the bit stream of the data channel with respect to the other data channels in the system. This calculated delay amount is transmitted to the deskew circuit 402 via a fine delay select signal 404 and a coarse delay select signal 406.

The deskew circuit 402 uses the fine delay select signal 404 to account for skew errors that are smaller than a single sample word. For example, when using 8-bit sample words, the fine delay select signal 404 is used to account for skew errors less than 8 bits down to a single bit. The deskew circuit 402 uses the coarse delay select signal 406 to account for skew errors that are greater than a single sample word. For example, when using 8-bit sample words, the coarse delay select signal 406 is used to account for skew errors greater than 8 bits. Thus, by using the fine delay select signal 404 and the coarse delay select signal 406, the deskew circuit 402 can correct skew errors of any size, as will be described in greater detail subsequently.

Figure 5:
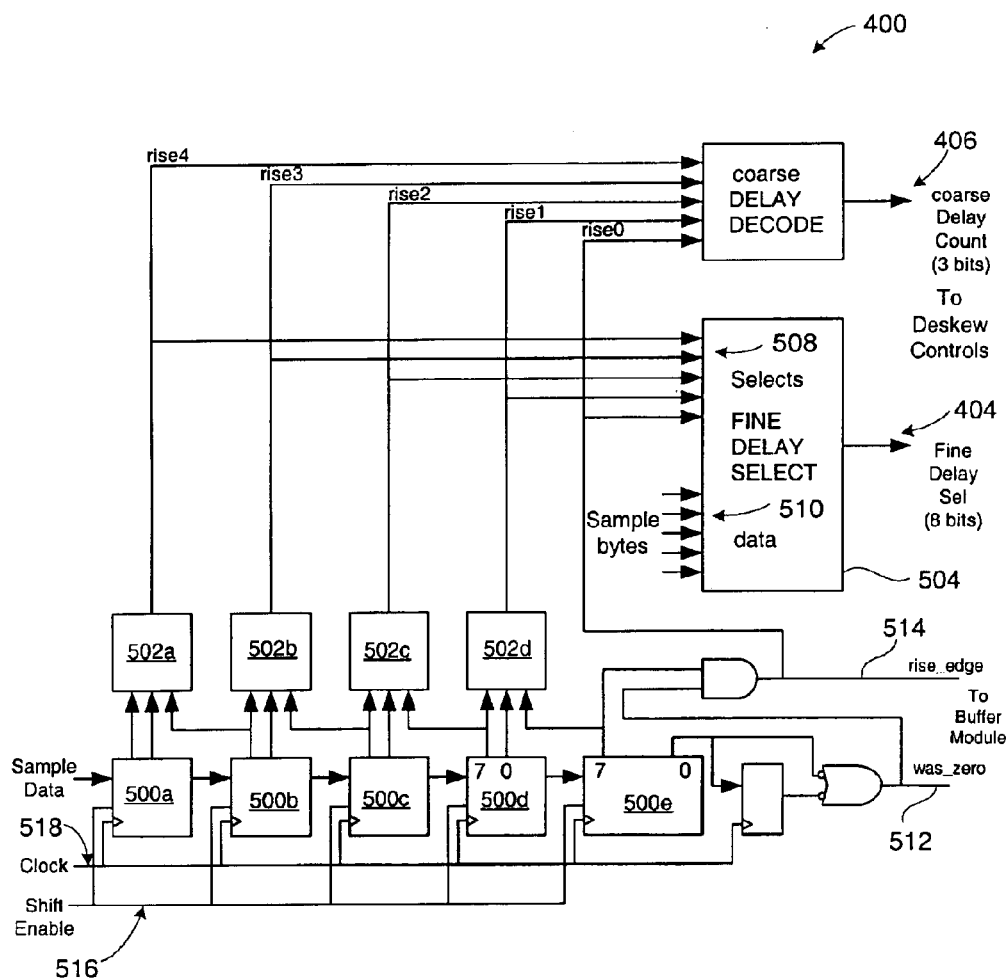
FIG. 5 is a schematic diagram showing a fine and coarse delay calculator, in accordance with an embodiment of the present invention.

FIG. 5 is a schematic diagram showing a fine and coarse delay calculator 400, in accordance with an embodiment of the present invention. The fine and coarse delay calculator 400 includes a plurality of shift registers 500a–500e coupled to a plurality of rising edge detectors 502a–502d. In addition, the fine and coarse delay calculator 400 includes a coarse delay decode unit 506 and a fine delay select unit 504. The coarse delay decode unit 506 receives as inputs the outputs of the plurality of rising edge detectors 502a–502d, and outputs the coarse delay select signal 406. The fine delay select unit 504 receives as select inputs the outputs of the plurality of rising edge detectors 502a–502d. In addition, the fine delay select unit 504 receives as data inputs the outputs of the plurality of shift registers 500a–500e, as described in greater detail subsequently. Using the select inputs, the fine delay select unit 504 outputs the fine delay select signal 404, which corresponds to one of the plurality of shift registers 500a–500e.

As described above, training data is transmitted through the DSP, and particularly, through the deskewer 206 before normal data is transmitted though a DSP. Generally, the training data comprises a plurality of signals having a value of 0 followed by a plurality of signals having a value of 1. Hence, the training data represents a line having a low signal followed by a rising edge, represented by the bit values having a value of 1. The fine and coarse delay calculator 400 uses the training data to determine the amount of delay needed to deskew the bit stream of the data channel with respect to the other data channels in the system.

Broadly speaking, the training data is transmitted through all the parallel channels in the system. Then, when the fine and coarse delay calculator 400 detects a 1 in the fastest channel, the transmission of the training data through all the parallel channels stops. The fine and coarse delay calculator 400 of each channel then determines appropriate amount of delay needed to correct skew for the channel with respect to the other parallel channels of the system.

More particularly, the training data is shifted into the shift registers 500a–500e in 8-bit words. For example, during the first clock cycle, an 8-bit word of the bit stream for the particular channel is shifted into shift register 500a. Then, in the next clock cycle, the 8-bit word stored in shift register 500a is shifted to shift register 500b, and the next 8-bit word of the bit stream for the particular channel is shifted into shift register 500a. This process is controlled using the clock signal 518 and the shift enable signal 516, both of which are coupled to each shift register 500a–500e.

At this point, the fine and coarse delay calculator 400 begins checking for a rising edge in the input signal, which is indicated by a change in the input bit stream from a value of 0 to a value of 1. This change is detected via the rise_edge signal 514 and the was_zero signal 512. Every clock, embodiments of the present invention perform an edge check on the last shift register 500c to determine whether the last shift register 500e includes a value of 1 in the 8-bit word stored in the shift register 500e. The was_zero signal 512 is asserted whenever the preceding edge check resulted in a value of 0 in the last shift register, while the rise_edge signal 514 is asserted whenever the current edge check results in a 1 in the last shift register. Thus, embodiments of the present invention detect the rising edge in the training signal by checking for at situation wherein a zero was detected during the preceding clock pulse and a 1 is detected during the current clock pulse. In this manner, embodiments of the present invention avoid being affected by noise on the signal line.

During training, a check is made ever clock to determine whether a 1 is detected in the last shift register, which in the example of FIG. 5 is shift register 500e. When a 1 is detected in the 8-bit word stored in the last shift register 500e, the process is halted in all the parallel channels of the system using the shift enable signal 516. That is, all shift registers 500a–500e for all the parallel channels stop shifting data. In this manner, the shift registers 500a–500e store a "snap shot" of the data bit streams for the entire system for a particular amount of time.

When the training process is halted, the faster channels will include the 1 bits from the signal edge in shift registers that are later in the signal path, such as shift registers 500d and 500e. Slower channels will include the 1 bits from the signal edge in shift registers that are earlier in the signal path, such as shift registers 500a, 500b, or 500c. The embodiments of the present invention use these shift register positions to determine the amount of delay to insert in each particular channel for deskewing.

In particular, when the training process is halted, the rising edge detectors 502a–502d are used to indicate which shift register 500a–500e includes the rising edge of the training signal for that particular channel. Specifically, each rising edge detector 502a–502d is coupled to a corresponding shift register 500a–500d, and includes logic that determines whether the corresponding shift register 500a–500d includes a transition from a 0 bit to a 1 bit in the 8-bit word stored in the shift register. The last shift register 500e can omit the rising edge detector, since the rise_edge signal 514 will be asserted if this shift register includes a 1 bit value, indicating a transition from low to high, when the training process is halted. Preferably, the rising edge detectors 502a–502d and the rise_edge signal 514 are all mutually exclusive. That is, when the training process is halted, preferably only one of the rising edge detectors 502a–502d or the rise_edge signal 514 will assert a value of 1 as an output, in the case of the rising edge detectors 502a–502d, or as the signal itself, in the case of the rise_edge signal 514.

The outputs from the rising edge detectors 502a–502d and the rise_edge signal 514 are provided to the coarse delay decode unit 506. In one embodiment, the coarse delay decode unit 506 decodes the input rising edge signals and outputs the coarse delay select signal 406, which correlates to the shift register that includes the rising edge of the training signal. That is, the coarse delay select signal 406 correlates to the shift register that includes a transition from bits having a value of zero to bits having a value of 1.

In addition, the outputs from the rising edge detectors 502a–502d and the rise_edge signal 514 are provided as select input signals 508 to the fine delay decode unit 504. The select input signals 508 indicate the shift register that includes a transition from bits having a value of zero to bits having a value of 1. The bits of the 8-bit word stored in the indicated shift register 500 are then provided as data inputs 508 to the fine delay decode unit 504. These bits are then used to indicate the exact bit location within the shift register where the transition from low to high in the training signal occurred, which is output as the fine delay select signal 404.

Figure 6:
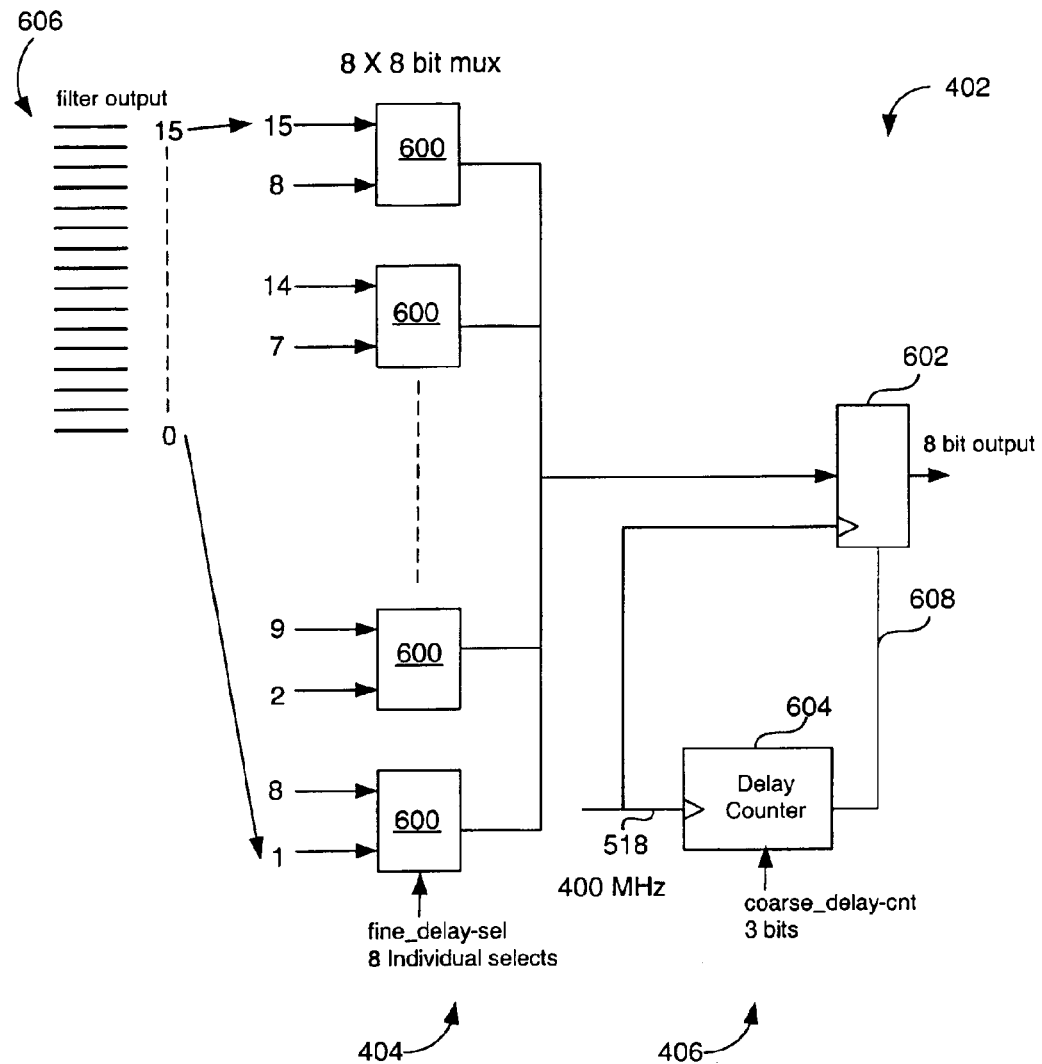
FIG. 6 is a schematic diagram showing a deskew circuit, in accordance with an embodiment of the present invention.

As mentioned previously, the fine delay select signal 404 and the coarse delay select signal 406 are provided to the deskew circuit 402, which uses the fine delay select signal 404 and the coarse delay select signal 406 to deskew the bit stream for the current channel. FIG. 6 is a schematic diagram showing a deskew circuit 402, in accordance with an embodiment of the present invention. The deskew circuit 402 includes a plurality of 8-to-1 input multiplexers 600 coupled to an output circuit 602. The fine delay select signal 404 is provided as a select signal to each of the plurality of input multiplexers 600, and the coarse delay select signal is provided to a delay counter 604, which provides a select signal to the output circuit 602.

In operation, a 16-bit input word 606 is received from the dual stage filter 204, wherein bit 0 of the 16-bit input word 606 is the most recent data sample and bit 15 is the oldest data sample. In one embodiment, the bits of the 16-bit input word are coupled to the input multiplexers 600 in 8-bit chunks, wherein sequential input multiplexers 600 are offset in the 16-bit input word by one bit. For example, a first input multiplexer 600 is coupled to bits 15–8 of the 16-bit input word. The second input multiplexer 600 is coupled to bits 14–7 of the 16-bit input word. This sequence continues on down to the seventh input multiplexer 600, which is coupled to bits 9–2 of the 16-bit input word, and the eighth input multiplexer 600, which is coupled to bits 8–1 of the 16-bit input word. Thus, the input multiplexers 600 form a barrel shift register. In this manner, any group of eight sequential bits can be selected from the 16-bit input word and provided to the output circuit 602, as described next in greater detail with respect to FIG. 7.

Figure 7:
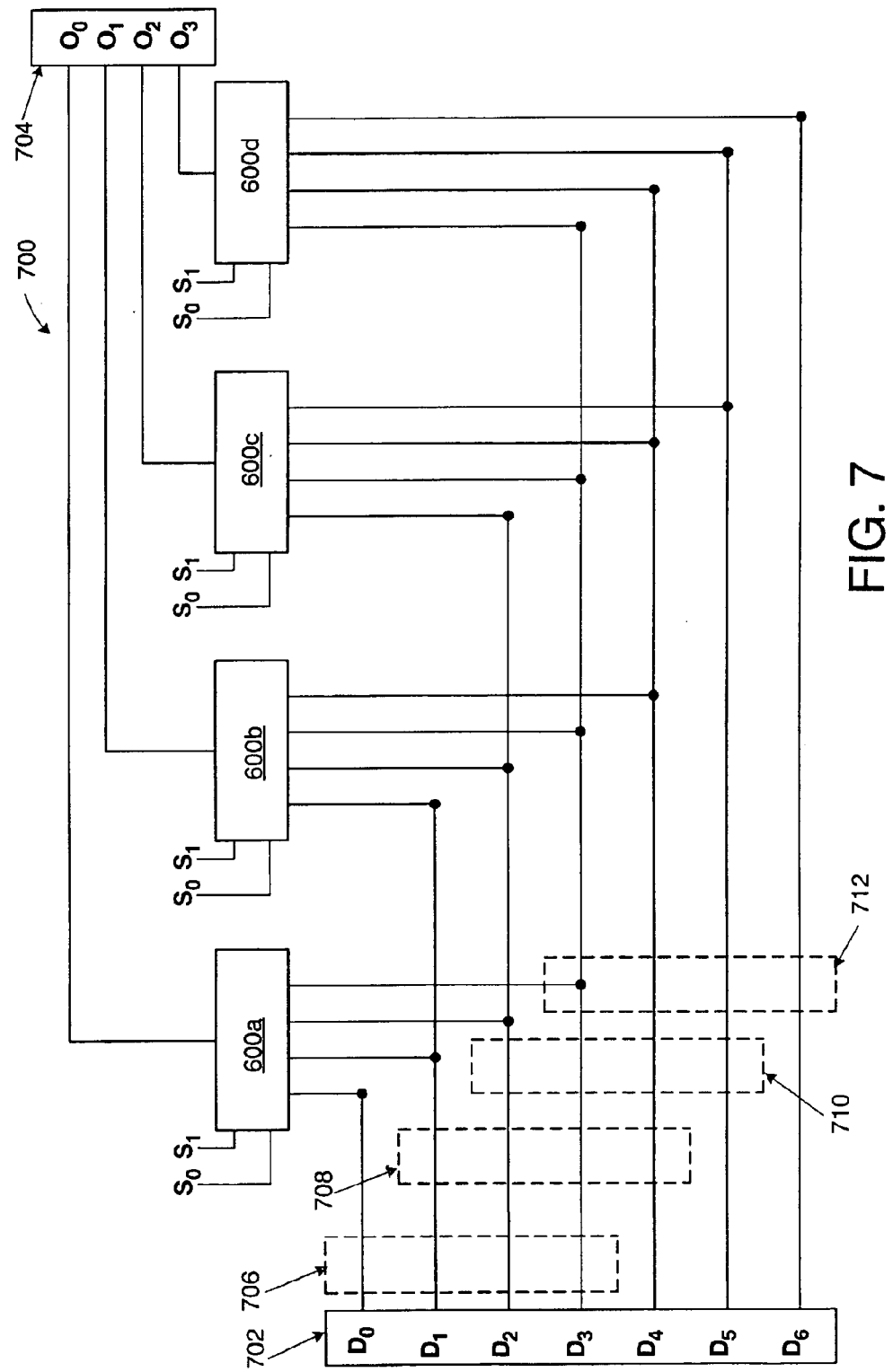
FIG. 7 is a schematic diagram showing an exemplary barrel shift register, in accordance with an embodiment of the present invention.

FIG. 7 is a schematic diagram showing an exemplary barrel shift register 700, in accordance with an embodiment of the present invention. The exemplary barrel shift register 700 can be used to select any four consecutive bits from the 7-bit input word 702, however it should be noted that the barrel register 700 can be extended to select eight consecutive bits, as described in greater detail subsequently. As shown in FIG. 7, the barrel shift register 700 includes four 4-to-1 multiplexers 600a–600d, each coupled to a 7 bit input word 702. In particular, the bits of the 7-bit input word are coupled to the multiplexers 600a–600d in 4-bit chunks, wherein sequential multiplexers 600a–600d are offset in the 7-bit input word by one bit. In particular, multiplexer 600a is coupled to bits D0–D3 of the 7-bit input word. Multiplexer 600b is coupled to bits D1–D4 of the 7-bit input word. Continuing the sequence, multiplexer 600c is coupled to bits D2–D5 of the 7-bit input word, and multiplexer 600d is coupled to bits D3–D6 of the 7-bit input word. In this manner, any group of four sequential bits can be selected from the 7-bit input word and provided to the output register 704 using the select signals S0 and S1.

Select signals S0 and S1 are provided to each multiplexer 600a–600d as select signals, which allow the selection of one particular input line to be placed on the output line. Further, since select signals S0 and S1 are similarly coupled to each multiplexer 600a–600d, the values placed on select signals S0 and S1 will select the same input for each multiplexer 600a–600d to be placed on the particular multiplexer's output line. For example, when the select signals S0 and S1 are set to select the first input signal for multiplexer 600a, the first input signal of each multiplexer 600b–600d will be selected as well.

Thus, any particular group of four bits 706–712 can be selected and provided as inputs to the output register 704 using the select signals S0 and S1. For example, to select group 706, the select signals S0 and S1 could be set such that the first input of each multiplexer 600a–600d is selected. Thus, multiplexer 600a would place input D0 on output line O0, multiplexer 600b would place input D1 on output line O1, multiplexer 600c would place input D2 on output line O2, and multiplexer 600d would place input D3 on output line O3. In a similar manner, to select group 710, the select signals S0 and S1 could be set such that the third input of each multiplexer 600a–600d is selected. Thus, multiplexer 600a would place input D2 on output line O0, multiplexer 600b would place input D3 on output line O1, multiplexer 600c would place input D4 on output line O2, and multiplexer 600d would place input D5 on output line O3.

Although the exemplary barrel shift register 700 is illustrated for selecting four consecutive bits, it should be noted that the exemplary barrel shift register 700 can be used to select any number of consecutive input bits. In particular, the exemplary barrel shift register 700 can be extended to select eight consecutive bits by using 8-to-1 multiplexers 600.

Referring back to FIG. 6, the fine delay select signal 404 is provided to each of the 8-to-1 input multiplexers 600, thus allowing the selection of any group of eight consecutive bits from the 16-bit input word 606. As mentioned previously, during training the fine and coarse delay calculator 400 generates the fine delay select signal 404 such that the fine delay select signal 404 indicates the bit location where a transition from a 0 to 1 occurred. The embodiments of the present invention use this information to adjust skew within an 8-bit sample word. Specifically, the input multiplexers 600 are configured to select eight consecutive bits in the 16-bit input word 606 such that the bit location of the transition from 0 to 1 is placed at the output of the eighth multiplexer 600, which is coupled to lines 8-1 of the 16-bit input word 606. In this manner, the output lines of the input multiplexers 600 provide an 8-bit sample word to the output circuit 602, wherein bit 0 of the 8-bit sample word includes the training transition.

Skew correction of greater than an 8-bit sample word is performed using the output circuit 602 in conjunction with the delay counter 604. The coarse delay select signal 406 is provided to the delay counter 604, which processes the signal to generate an output select signal 608 that is provided to the output circuit 602. The output circuit 602 then performs coarse skew correction and provides the deskewed 8-bit sample word to the rest of the DSP, as described in greater detail next with reference to FIG. 8.

Figure 8:
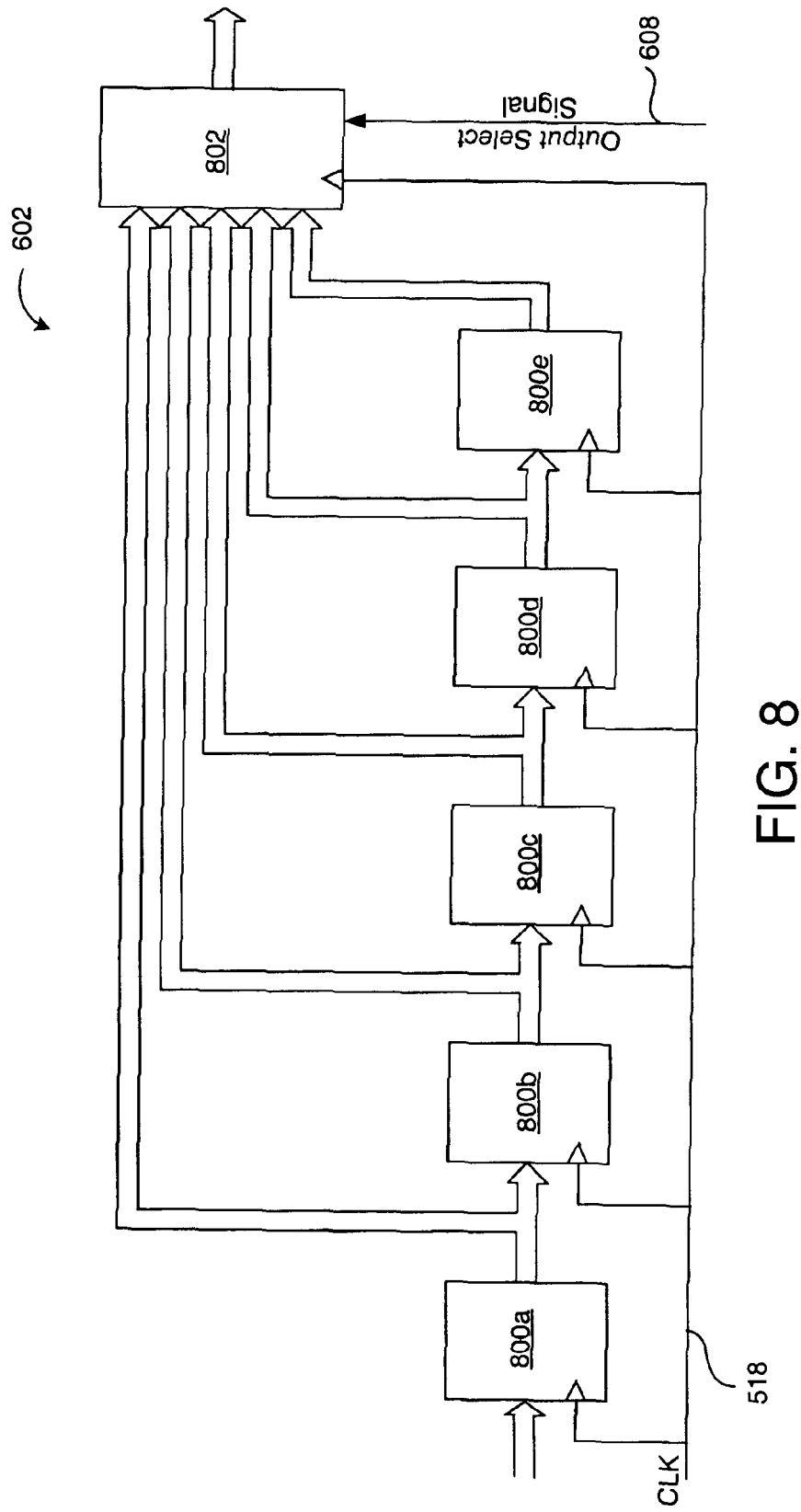
FIG. 8 is a schematic diagram showing an output circuit, in accordance with an embodiment of the present invention.

FIG. 8 is a schematic diagram showing an output circuit 602, in accordance with an embodiment of the present invention. The output circuit 602 includes a plurality of serially coupled output shift registers 800a–800e, each having an 8-bit output coupled to both an output multiplexer 802 and to a subsequent output shift register. The exception being output multiplexer 800e, which is coupled to output multiplexer 802. Each clock, the sample 8-bit word selected via the input multiplexers 600 is shifted into output shift registers 800a and the data stored in each output shift register 800a–800c is shifted one register forward. The output multiplexer 802 also receives as an input the output select signal 608 that is generated via the delay counter 604.

The output shift registers 800a–800e correspond to the shift registers 500a–500e of the fine and coarse delay calculator 400. In particular, the delay counter 604 sets the output select signal 608 to configure the output multiplexer 802 to select the output from the particular output shift register 800a–800e that corresponds to the shift register 500a–500e that included the transition from 0 to 1 during the training process. For example, if the channel was particularly fast, the transition from 0 to 1 may have occurred in shift register 500e of the fine and coarse delay calculator 400 during the training process. In this case, the delay counter 604 would set the output select signal 608 to configure the output multiplexer 802 to select the output from output shift register 800e, since output shift register 800e corresponds to shift register 500e. On the other hand, if the channel was particularly slow, the transition from 0 to 1 may have occurred in shift register 500c of the fine and coarse delay calculator 400 during the training process. In this case, the delay counter 604 would set the output select signal 608 to configure the output multiplexer 802 to select the output from output shift register 800c, since output shift register 800c corresponds to shift register 500c. In this manner, the output circuit 602 provides coarse skew correction for delays greater than a single sample word.

Thus, the deskewer of the embodiments of the present invention provides skew correction for parallel channels, and further allows deskewing based on the individual needs of each data channel. Moreover, the embodiments of the present invention can automatically determine the amount of skew correction needed by each data channel. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A deskewer for correcting skew on a data channel, comprising:
    a delay calculator that calculates deskew data indicating an amount of delay to correct skew on a data channel, wherein the delay calculator calculates the deskew data using a training signal, the training signal comprising a plurality of bits having a value of zero followed by a plurality of bits having a value of one; and
    a deskew circuit coupled to the delay calculator, wherein the deskew circuit receives the deskew data from the delay calculator and uses the deskew data to delay a bit stream on the data channel.

2. A deskewer as recited in claim 1, wherein the deskew data comprises a coarse delay select signal and a fine delay select signal.

3. A deskewer as recited in claim 2, wherein the fine delay select signal indicates an amount of delay that accounts for skew errors less than a single sample word.

4. A deskewer as recited in claim 3, wherein the coarse delay select signal indicates an amount of delay that accounts for skew errors greater than the single sample word.

5. A deskewer as recited in claim 4, wherein the single sample word is eight bits.

6. A deskewer as recited in claim 1, wherein the deskew circuit selects a sample group of consecutive bits from the input stream that includes a number of bits equal to a size of a sample word, the bits being selected based on the deskew data.

7. A deskewer as recited in claim 6, wherein the sample group is selected from an input set of the most recent bits in the bit stream, wherein the input set includes a number of bits equal to twice the size of the sample word.

8. A deskewer as recited in claim 7, wherein the deskew circuit further delays the sample group a number of clock cycles based by the deskew data.

9. A deskew circuit, comprising:
    a plurality of multiplexers coupled to an input bit stream, wherein the plurality of multiplexers is capable of selecting a sample group of consecutive bits from an input stream that includes a number of bits equal to a size of a sample word; and
    an output circuit coupled to receive the sample group from the plurality of multiplexers, wherein the output circuit delays the sample group for a predetermined number of clock cycles.

10. A deskew circuit as recited in claim 9, wherein the sample group is selected based on a fine delay input.

11. A deskew circuit as recited in claim 10, wherein the fine delay input indicates an amount of delay that accounts for skew errors less than a single sample word.

12. A deskew circuit as recited in claim 9, wherein the predetermined number of clock cycles is based on a coarse delay input.

13. A deskew circuit as recited in claim 12, wherein the coarse delay input indicates an amount of delay that accounts for skew errors greater than the single sample word.

14. A deskew circuit as recited in claim 9, wherein the sample group is selected from a input set of the most recent bits in the bit stream, wherein the input set includes a number of bits equal to twice the size of the sample word.

15. A deskew delay calculator, comprising:
    a plurality of shift registers serially coupled to an input line;
    a plurality of rising edge detectors coupled to the plurality of shift registers, each rising edge detector capable of determining whether a signal transition occurred within a particular shift register;
    a coarse delay decode unit coupled to the plurality of rising edge detectors, the coarse delay decode unit capable of indicating an amount of delay that accounts for skew errors greater than the single sample word based on a state of the rising edge detectors; and
    a fine delay select unit coupled to the plurality of shift registers, the fine delay select unit capable of indicating an amount of delay that accounts for skew errors less than a single sample word based on a state of a selected shift register.

16. A deskew delay calculator as recited in claim 15, wherein the signal transition comprises at least on one bit having a value of zero followed by at least one bit having a value of one.

17. A deskew delay calculator as recited in claim 16, wherein the fine delay select unit is further coupled to the plurality of rising edge detectors.

18. A deskew delay calculator as recited in claim 17, wherein the selected shift register is indicated by the state of the plurality of rising edge detectors.

* * * * *